(12) United States Patent
Au

(10) Patent No.: US 10,056,963 B1
(45) Date of Patent: Aug. 21, 2018

(54) PORTABLE MACRO ANTENNA SYSTEM

(71) Applicant: T-Mobile USA, Inc., Bellevue, WA (US)

(72) Inventor: Chad Au, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/465,941

(22) Filed: Mar. 22, 2017

(51) Int. Cl.
*H04B 7/145* (2006.01)
*H04W 16/26* (2009.01)
*H01Q 1/24* (2006.01)
*H01Q 15/14* (2006.01)
*H01Q 1/28* (2006.01)
*H04W 88/02* (2009.01)

(52) U.S. Cl.
CPC ............ *H04B 7/145* (2013.01); *H01Q 1/246* (2013.01); *H01Q 1/28* (2013.01); *H01Q 15/14* (2013.01); *H04W 16/26* (2013.01); *H04W 88/02* (2013.01)

(58) Field of Classification Search
CPC .. H04B 7/18504; H04B 1/3822; H04B 7/145; H04B 7/18502; B64C 2201/022; B64C 2201/122; H01Q 1/28; H01Q 1/082; H01Q 15/14; H01Q 15/18; H01Q 15/20; H01Q 19/10; H01Q 1/1292; H01Q 1/246; H04W 16/26; H04W 88/02
See application file for complete search history.

(56) References Cited

U.S. PATENT DOCUMENTS 6,397,063 B1 * 5/2002 Sessions ................ H04B 17/27
455/425
2003/0148794 A1 * 8/2003 Wilson, Jr. ........... H01Q 1/1242
455/562.1
2004/0035034 A1 * 2/2004 Quade ..................... E04H 15/20
40/610
2004/0219877 A1 * 11/2004 Myer ..................... H04B 7/145
455/11.1
2006/0049305 A1 * 3/2006 Porter ....................... B64B 1/06
244/31

(Continued)

FOREIGN PATENT DOCUMENTS

WO WO2005032936 4/2005

OTHER PUBLICATIONS

The PCT Search Report and Written Opinion dated Jun. 29, 2018, for PCT Applciation No. PCT/US18/22200, 15 pages.

*Primary Examiner* — Thai Vu
(74) *Attorney, Agent, or Firm* — Lee & Hayes, PLLC

(57) ABSTRACT

Systems and methods for providing temporary cell coverage using lighter than air reflectors. The system can include a balloon or airship (e.g., a blimp) with a reflective lower surface. A ground-based source antenna can be aimed at the balloon to bounce cellular, or other communications, signals off the balloon and then back to the ground. The system can provide additional wireless coverage and bandwidth in remote locations and/or areas of high demand. The coverage area of the system can be adjusted by changing the shape of the bottom surface of the balloon. The coverage area of the system can also be adjusted by changing the height of the balloon above the source antenna. A dedicated source antenna and balloon can also serve as a microwave backhaul antenna system for a temporary cell site, using a balloon with a reflective surface shaped to collimate the radio link in a desired direction.

20 Claims, 15 Drawing Sheets

(56) References Cited

U.S. PATENT DOCUMENTS

| | | |
|---|---|---|
| 2007/0014125 A1 | 1/2007 | Chu |
| 2015/0360763 A1 | 12/2015 | Smith et al. |
| 2015/0373558 A1* | 12/2015 | Weisbrod .............. H04W 16/28 455/404.1 |
| 2017/0155199 A1* | 6/2017 | Rankin .................. H01Q 15/14 |
| 2017/0156044 A1* | 6/2017 | Meredith ................ H04W 4/22 |

* cited by examiner

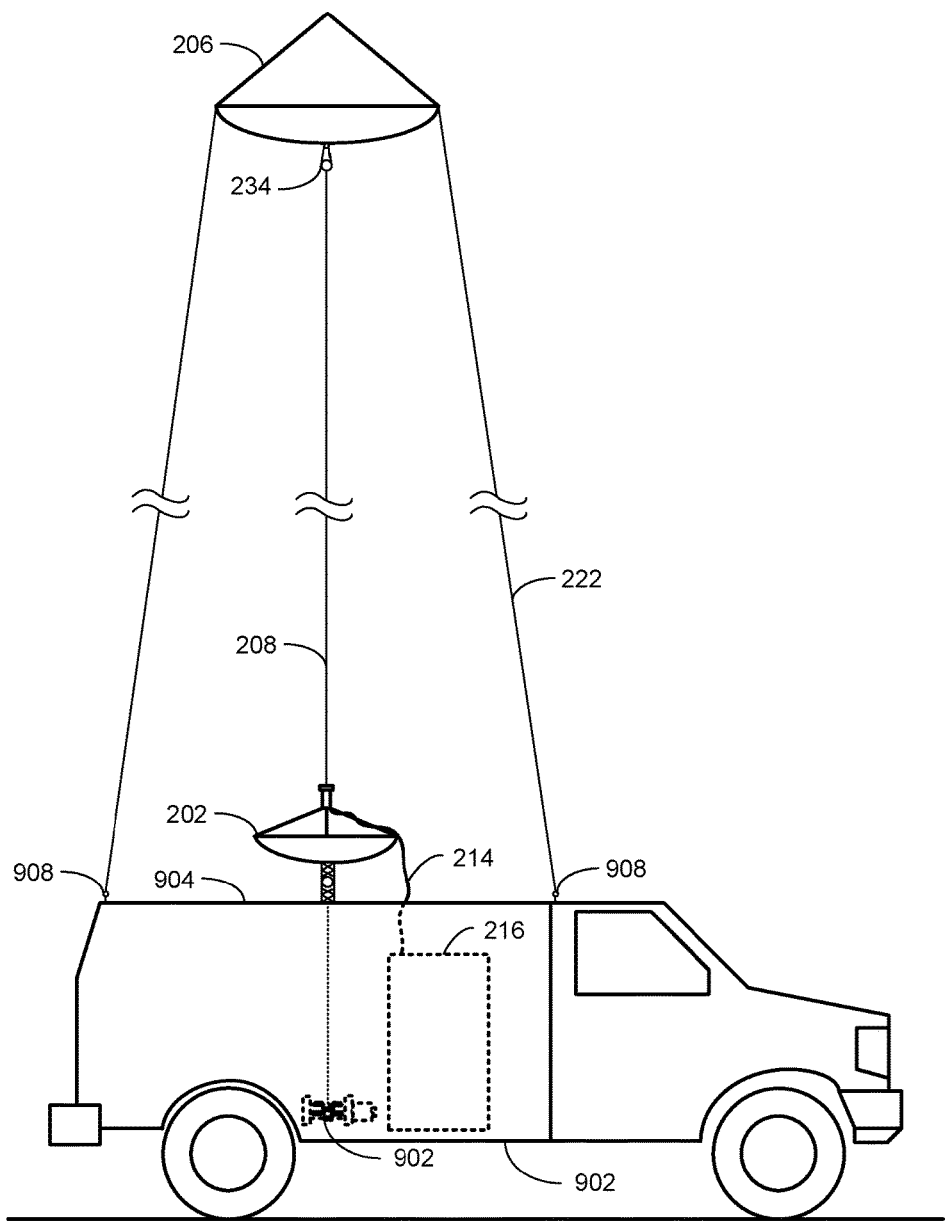

PORTABLE MACRO ANTENNA SYSTEM

BACKGROUND

Cellular communications systems use a variety of transceivers to connect cellular phones to the cellular network (or, "backbone," which often refers specifically to the aggregated backhaul portion of a cellular network). These can include macro cells (or, cell towers), mini- and micro-cells, and even wireless routers. A majority of cellular calls, however, are affected using cell towers. Each cell tower may provide the ability to connect hundreds (e.g., for fourth generation, or 4G) or thousands (e.g., fifth generation, or 5G) of cellular calls and/or cellular data connections at the same time.

In some situations, however, a single cell tower, or even a few cell towers, may not be able to provide enough bandwidth to meet demand. At a concert, ball game, or other large event—which may be served by a single or a few cell towers—the number of cellular users may exceed the bandwidth available. As a result, users may experience slow connection speeds, dropped calls, denied connection, and other issues. In other situations such as natural disasters, antenna system support structures may be damaged, toppled, or completely destroyed.

Because these events may be temporary in nature, however, it may not be practical to install additional cell towers in the area. The cost to install and maintain a permanent cell tower may not be justified, for example, by the additional demand caused twice a month by football games at a stadium. To this end, cellular providers sometimes erect temporary cell sites to provide additional bandwidth during times of high demand.

Due to their construction, however, conventional temporary cell sites 100, like cell towers, are expensive, heavy, and bulky. As shown in FIG. 1, temporary cell sites 100 are generally mounted on heavy trucks 102 and include a telescoping mast 104 to hoist and support additional antennas 106 and cabling to provide additional bandwidth. In order to provide usable coverage, however, these masts 104 must be relatively tall (e.g., 50-100 feet) and thus, are very heavy. As a result, these systems are generally mounted on large commercial trucks 102, which alone can cost in excess of $100,000. And this does not include the mast 104, antennas 106, dishes 108, generators, base transceiver station (BTS), and attendant equipment. Thus, current temporary cell sites 100 can cost $50k-$200k, or more, depending on capacity.

Even using large commercial trucks 102, however, the coverage provided by these temporary cell sites 100 is nonetheless mechanically limited by (1) the mast and (2) the cabling required. In order to remain portable, yet still support its own weight and the weight of the necessary cabling from the antennas 106 to the truck 102, for example, the telescoping mast 104 is generally limited to approximately 120 feet tall. Any taller and the mast 104 becomes so massive that the structure required to support it and the attendant cabling becomes too massive to fit on and/or too heavy to be transported and stabilized by a standard commercial truck to prevent tipping. Thus, these temporary cell sites 100 provide only very limited coverage areas dictated at least in part by the relatively low height of the antennas 106.

BRIEF DESCRIPTION OF THE DRAWINGS

FIG. 9C depicts the van-mounted system of FIG. 9A in a deployed position, in accordance with some examples of the present disclosure.

DETAILED DESCRIPTION

Examples of the present disclosure can comprise systems, apparatuses, and methods for providing cellular coverage using a lighter-than-air reflector. The system can include a source antenna aimed at the lighter-than-air reflector. The lighter-than-air reflector can be sized and shaped to reflect cellular, radio-frequency (RF), or other electro-magnetic signals from the source antenna back to cellular devices near the ground and from the cellular devices near the ground back to the source antenna. The coverage area for the system can be tailored by adjusting the height and shaped of the lighter-than-air reflector.

To simplify and clarify explanation, the lighter-than-air reflector is described below as a "balloon" with a reflective surface tethered to the ground. Ones of skill in the art will recognize, however, that the system could also use other lighter-than-air objects and vehicles as the lighter-than-air reflector. Thus, the system could include dirigibles or drones, for example, that are not tethered to the ground, but instead maintain a relative position above the source antenna using onboard navigation systems. Similarly, while described below for use with cellular communications systems, the system could also be used with other types of wireless communications systems; or indeed, any time wireless signals need to be transmitted and received over a relatively large area. A dedicated source antenna and balloon can serve as the microwave backhaul antenna system for a temporary cell site, for example, using a balloon with a reflective surface shaped to collimate the radio link in the desired direction.

Figure 1:
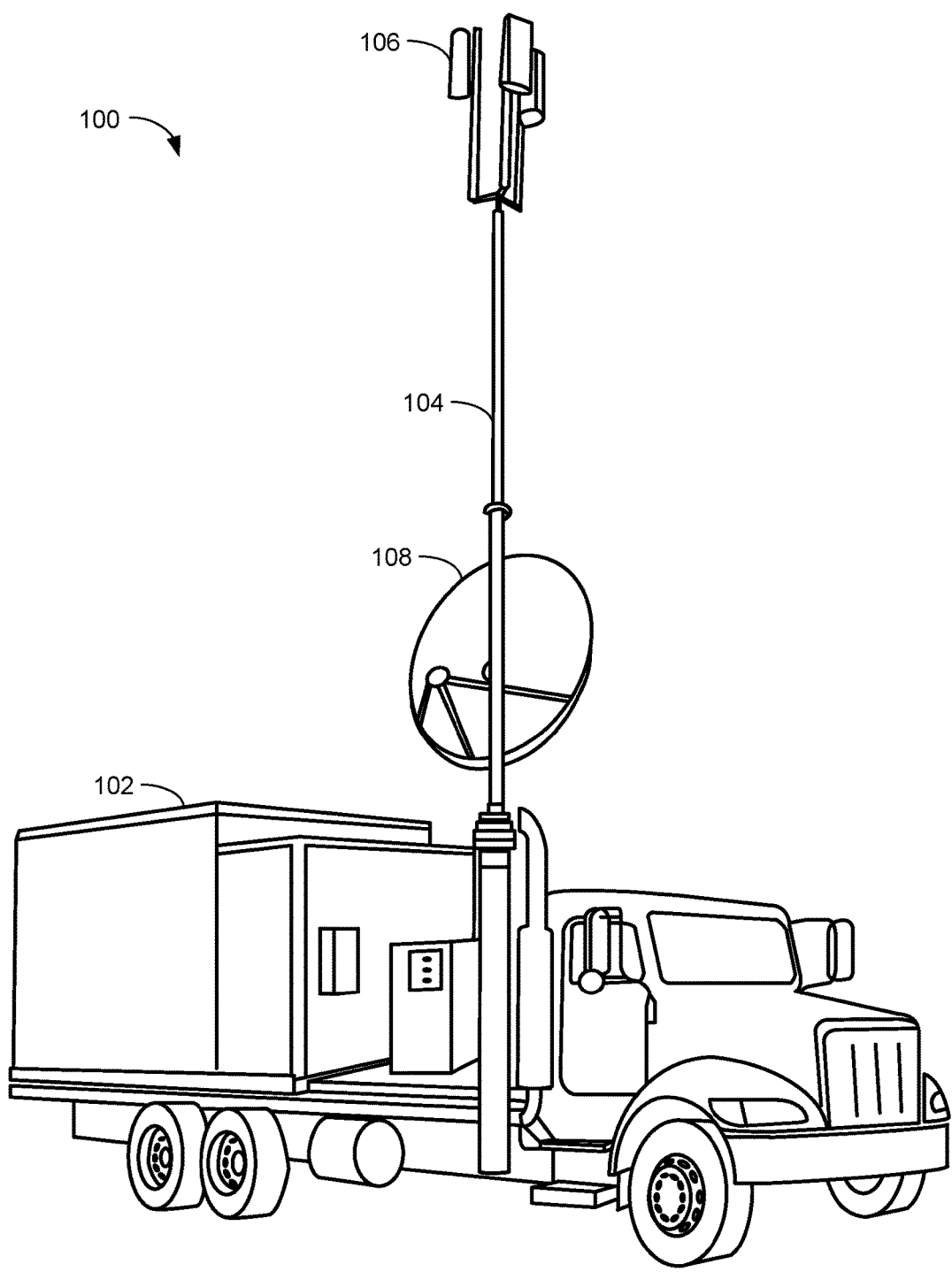
FIG. 1 depicts a side view of a conventional temporary cell site.

As mentioned above, and shown in FIG. 1, a problem with conventional temporary cell sites 100 is the use of a mast 104. The mast 104 is necessary, however, due to the weight of the antennas 106 and cabling used to connect the antennas 106 to the truck 102 and then to the network. As the height of the mast 104 increases, the size and weight of the mast 104 increases significantly. This is due in part to the mast 104 simply having to support its own weight and resist outside forces such as wind. This is also due to the size and weight of the cabling and antennas 106. The weight of the cabling increases, for example, both because the cabling simply gets longer, but also because longer cables must be larger to minimize signal loss over longer distances. Stabilizing the temporary cell site 100 also becomes more difficult as height of the mast 104 increases due to the increased moment the mast 104 exerts on the truck 102. As a result, in emergency backup applications, the temporary cell site 100 may be a poor substitute for the downed site simply due to its limited height.

Without using exotic and expensive materials (e.g., carbon fiber), therefore, these issues effectively limit the height of the mast to approximately 120 feet. Any taller, and the mast becomes so massive that it either cannot be carried, or will not fit, even on a commercial truck. Thus, the coverage area provided by these systems is limited by this height restriction. In addition, these systems are not easily expandable because providing additional bandwidth requires additional cabling, further limiting the height of the mast.

To this end, it would be useful to relocate as much of the system as possible to the truck or the ground. A system with the source antenna located on the ground, for example, eliminates the need to support the antenna and tens or hundreds of feet of cabling. In addition, if the airborne portions of the system were self-supporting, then little or no structure is required, removing the above-mentioned height limitations. It is to such systems and methods that examples of the present disclosure are primarily directed.

Figure 2A:
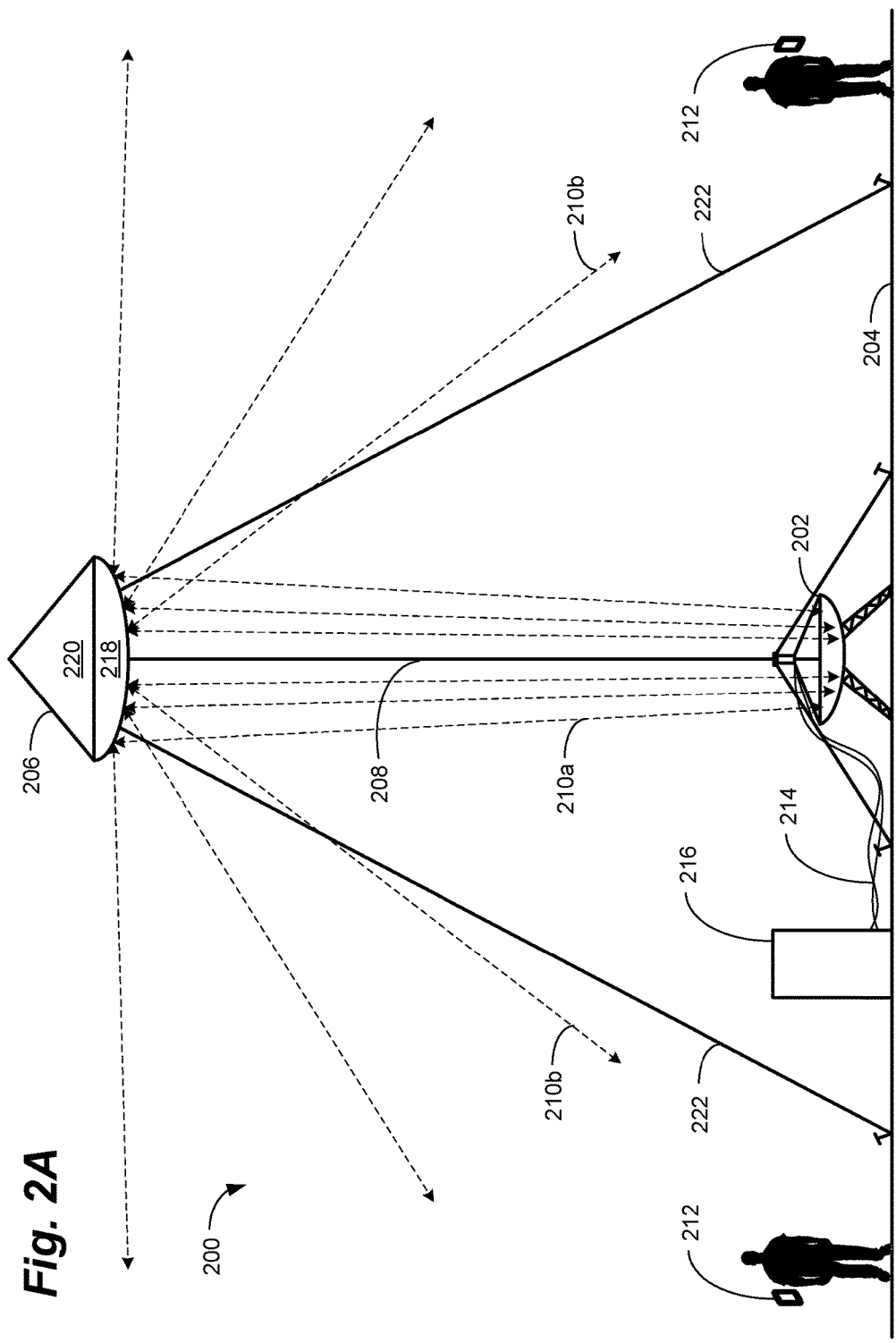
FIG. 2A depicts a side view of a temporary cell site system with a lighter-than-air reflector, or "balloon," in accordance with some examples of the present disclosure.
Figure 2B:
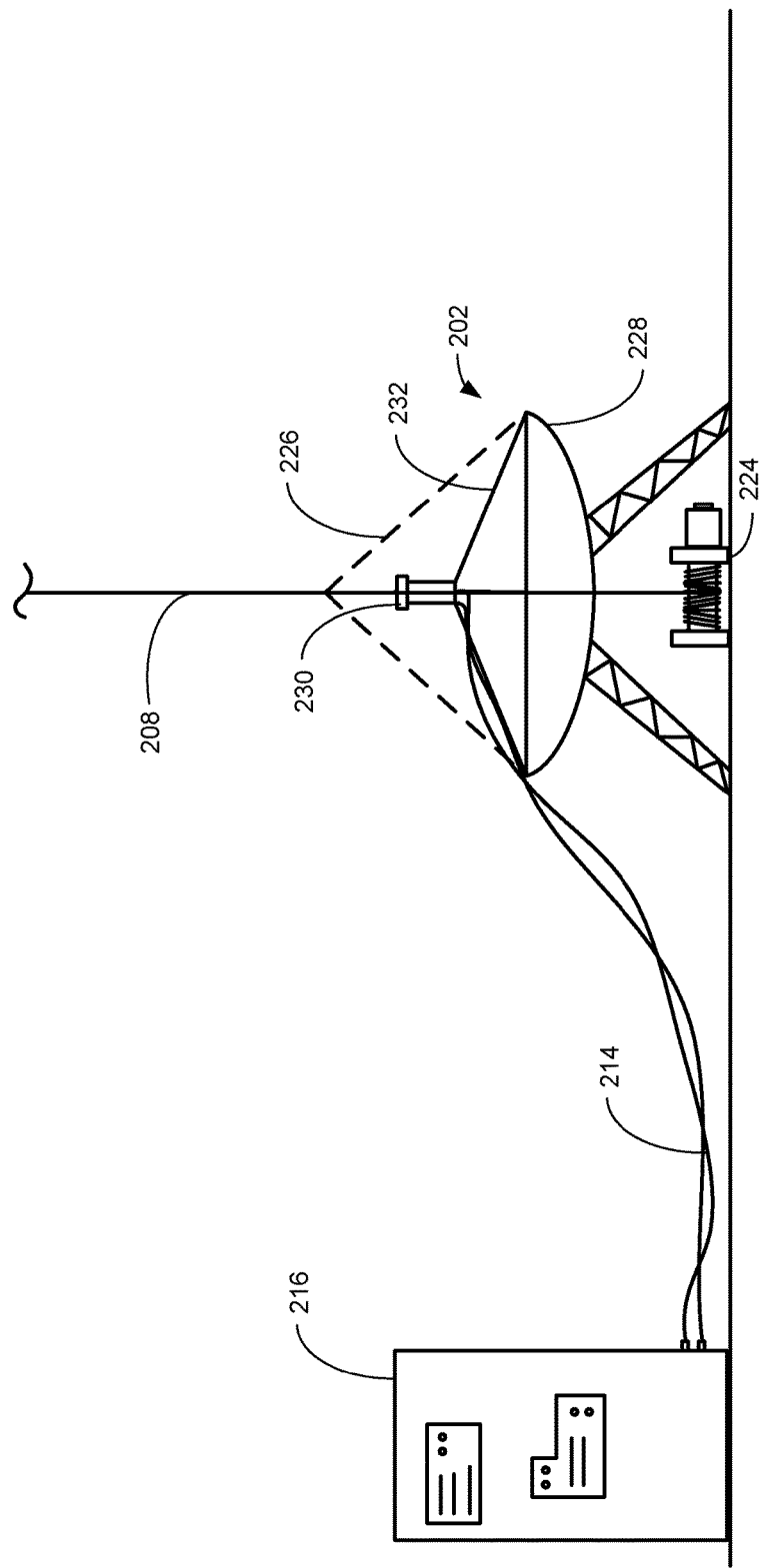
FIG. 2B depicts a detailed, side view of a ground portion of the temporary cell site system, in accordance with some examples of the present disclosure.

As shown in FIGS. 2A and 2B, in some examples, rather than using an airborne antenna, for example, the system 200 can include a source antenna 202 located on, or near, the ground 204, and a lighter-than-air reflector, or balloon 206, located in an elevated location above the source antenna 202. In this manner, no cabling or other equipment is required in an elevated location. In addition, because the balloon 206 is self-supporting, no heavy structure is required. Thus, as shown, the balloon 206 may be simply tethered to the system 200 (e.g., the source antenna 202 or ground 204) with a tether 208.

In some examples, the source antenna 202 can comprise a parabolic dish reflector configured to provide a relatively collimated RF signal 210a primarily aimed at the balloon 206. In some examples, the size and shape of the source antenna 202 can be based at least in part on the size and shape of the balloon 206. In other words, the size of the source antenna 202 used to illuminate the balloon 206 can be selected to focus a beam that is substantially confined to the reflective area (discussed below) of the balloon 206 to minimize spillage and maximize efficiency. In some examples, the source antenna 202 can provide a multi-band dual polarization feed to increase the capacity provided by each source antenna 202.

As shown, the source antenna 202 can also be configured to receive signals 210b from cell phones, smart phones, computers, tablets, and other cellular communications devices—collectively, user equipment or UE 212—located near the ground 204 in duplex operation. At the above-mentioned rock concert, for example, this can include many users with cell phones making calls, texting, and browsing the internet. It may also include multiple computers with cellular modems in use by the sound crew or media personnel. Regardless, the transmitted signals from cellular devices travel up to the balloon 206 (in reality, they radiate spherically) with at least a portion of the transmitted signals being redirected to the source antenna 202 below for transmission to the cellular network.

The source antenna can be connected to the cellular network with one or more cables 214 to a base transceiver station (BTS) 216. The BTS 216 can be connected to a core, or "backbone," cellular network to provide voice and data connectivity, among other things. The BTS 216 can be connected to an alternative access vendor (AAV) network, for example, which utilizes Ethernet networks to meet needs of backhaul for broadband cellular services, such as long term evolution (LTE) networks, to provide additional bandwidth and/or additional wireless coverage.

The BTS 216 can also be connected to the backbone using fiber optic cable, for example, to connect to mobile switching offices (MSOs) over carrier networks for cellular backhaul. In other cases, for sites that lack direct fiber connectivity, the BTS 216 may use microwave wireless backhaul, for example, to connect to a nearby site that does have AAV fiber connectivity, but is sufficiently far from the system 200 location (e.g., the football game) to have available bandwidth. In some examples, a separate source antenna 202 and dedicated balloon 206 designed for microwave backhaul functionality can serve this purpose.

In some example, the BTS 216 can also include power hookups or an independent power source. The BTS 216 can be connected to mains power at the location, for example, or can include an onboard power generator. In some examples, the onboard power generator can include a gasoline or diesel powered generator, solar panels, or a wind turbine, among other things.

The balloon 206 can include two main components, the bottom reflective surface 218 and the top surface 220. As shown, in some examples, the bottom reflective surface 218 can comprise, or can be covered in, a surface that is reflective of RF and other wireless signals. In this manner, signals 210a from the source antenna 202 are reflected back towards the ground 204 to UEs 212 and signals 210b from UEs 212 are reflected back to the source antenna 202. In FIG. 2A the signals 210a, 210b are shown as separate lines for clarity. Of course, in reality, many of the signals 210 are radiating in all directions with a portion of the radiated energy bouncing back and forth between the UEs 212 and the source antenna 202 via the balloon 206.

Both the surface and the underlying material of the bottom reflective surface 218 can be tailored to the job at hand. For use with cellular systems, for example, the material for the bottom reflective surface 218 can be highly reflective of signals 210 in the frequency ranges used for cellular communications, but may be selectively transparent or semi-transparent to signals in other frequency ranges. Similarly, if the system 200 is being used in conjunction with microwave communications, the material for the bottom reflective surface 218 can be highly reflective of microwave signals, but may be transparent or semi-transparent to signals in other frequency ranges. This can reduce the effects (e.g., interference) of the system 200 on other types of communications systems in the same area.

In some examples, due to the relatively small footprint of the balloon 206, the bottom reflective surface 218 can be reflective for all relevant frequencies. This may reduce the cost of manufacturing the balloon 206, for example, and can reduce the number of models required for the system 200. In other words, if the bottom reflective surface 218 is reflective for all relevant wireless communications frequencies, then the system 200 is suitable for use with any wireless communications system without modification.

In some examples, the bottom reflective surface 218 can comprise a relatively thin, lightweight, flexible material that either comprises a reflective material or has a reflective coating. In some examples, the bottom reflective surface 218 can comprise, for example, a metalized polymer (e.g., Mylar®), which is light, strong, and reflective of many frequencies, including the signals 210 used for cellular communications. In other examples, the bottom reflective surface 218 can comprise a rubber or plastic material, for example, with a metallized coating or wire mesh applied.

In some examples, the top surface 220 can be sized and shaped to provide aerodynamic stability, shed water or bird droppings, and/or to provide the necessary volume to keep the balloon 206, the tether 208, and any additional equipment aloft. In some examples, as shown, the top surface 220 can form a cone or an A-frame for this purpose. In other examples, the top surface 220 can be flat, rounded, or many other shapes. In some examples, the top surface 220 can be shaped like a particular product or character to enable the balloon 206 to double as a marketing tool. So, for example, the top surface 220 may be shaped like the mascot of a particular company, for example, or a cartoon character from a popular TV show like a float in a parade. The top surface 220 may also include a hydrophobic coating to shed water, a solar reflective coating to prevent heat gain, or other coatings.

In other examples, the top surface 220 can comprise a cube to present at least four flat surfaces that can be seen from the ground 204. In some examples, the four flat surfaces can be coated with a reflective surface like a projection TV screen. In this manner, projectors or other equipment can be used to project video, pictures, advertisements, or other media on the top surface 220.

The tether 208 can be attached to the source antenna 202 and/or the ground 204 to set the height of the balloon 206 above the source antenna 202. Because the tether 208 need only keep the balloon 206 from floating away, the tether 208 can be quite small and lightweight. The balloon 206 can be configured or filled, for example, to have just enough buoyancy to rise above the source antenna 202 to a predetermined height (e.g., 100, 150, or 200 feet) and support the predetermined length of tether 208. To this end, the tether 208 may be subjected only to a very small upward force, for example, and some side loading from wind. Thus, while strength is not a major concern, the tether 208 can comprise nylon, Kevlar®, or Spectra®, among other things.

In some examples, the system 200 can also include one or more guy wires 222. The guy wires 222 can be used to keep the balloon 206 in relatively good alignment with the source antenna 202, for example, though precise alignment is not required for acceptable throughput. In some examples, the balloon 206 can be positioned vertically (i.e., directly above) the balloon 206. In other examples, as discussed below, the balloon 206 can be positioned in an offset position to avoid overhead obstacles, among other things. In some examples, the guy wires 222 can enable the position of the balloon 206 to be fine-tuned and can prevent excessive movement of the balloon 206 due to wind forces and other forces.

As shown in FIG. 2B, though not required, in some examples, the system 200 can also include a winch 224. The winch 224 can be used to raise and lower the balloon 206 and to position the balloon 206 at the predetermined height—e.g., the winch 224 can include an encoder, or other device, that enables its position (and thus, the height of the balloon 206 to be monitored). In some examples, the winch 224 can enable a balloon 206 with excess buoyancy to be used, which may be beneficial to the balloon's stability when aloft. As discussed below, in some examples, a balloon 206 with excess buoyancy can also be used to carry additional equipment aloft.

In some examples, the source antenna 202 can also include a radome 226. The radome 226 can substantially cover the dish 228 portion of the source antenna 202. In this manner, the radome 226 can prevent water and debris from collecting in the dish 228 and interfering with the signals 210 to and from the source antenna 202. The radome 226 can also prevent damage to the transceiver 230, supports 232, and other components proximate the dish 228. The radome 226 can comprise a suitably tough and RF transparent material such as, for example, polyethylene, polypropylene, fiberglass, or polycarbonate.

Figure 2C:
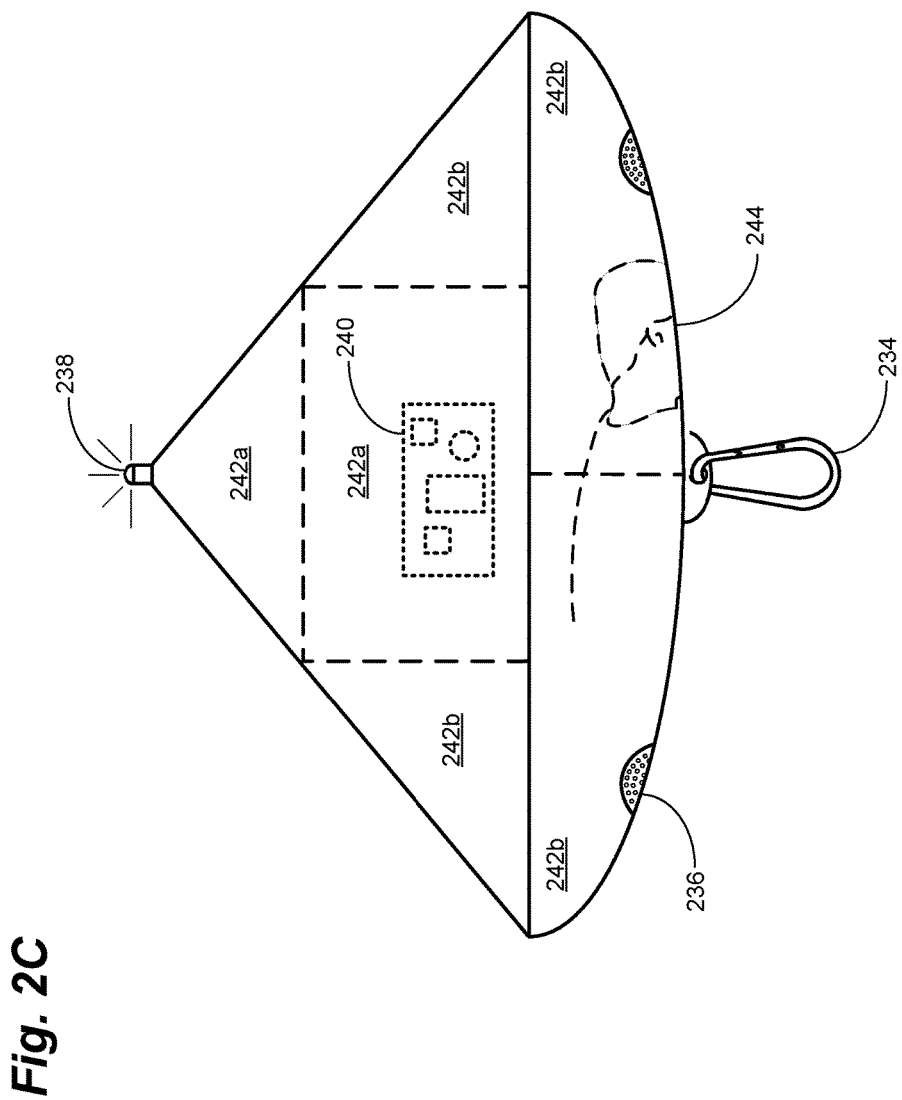
FIG. 2C is a side view of an example balloon for use with the temporary cell site system, in accordance with some examples of the present disclosure.
Figure 3A:
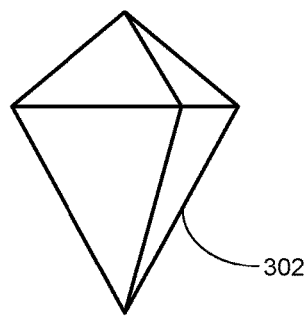
FIGS. 3A-3D depict a first example of a balloon to provide omni-coverage, in accordance with some examples of the present disclosure.
Figure 3B:
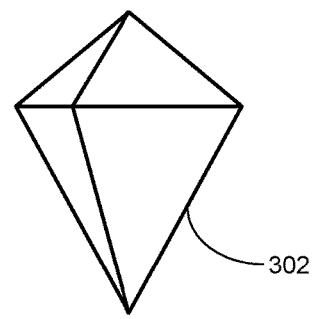
Figure 3C:
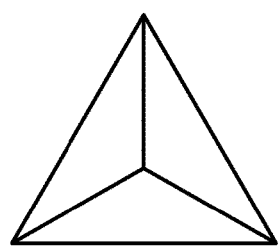
Figure 3D:
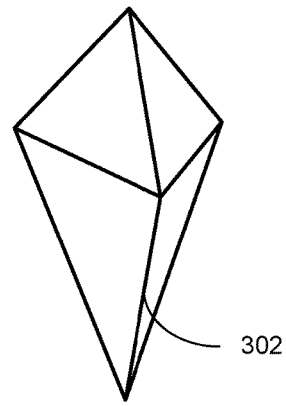
Figure 4A:
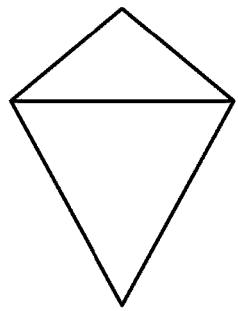
FIGS. 4A-4D depict a second example of the balloon to provide omni-coverage, in accordance with some examples of the present disclosure.
Figure 4B:
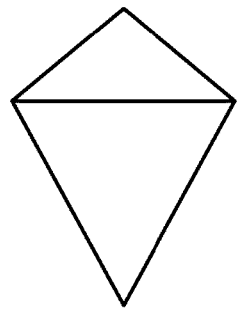
Figure 4C:
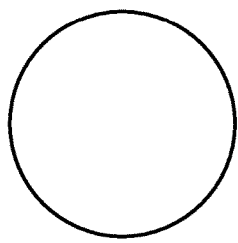
Figure 4D:
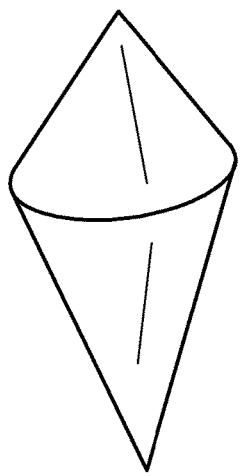

As shown in FIG. 2C, in some examples, the balloon 206 can comprise some additional equipment. In some examples, as shown, the balloon 206 can comprise a connector 234 to enable the balloon 206 to be easily connected and disconnected from the tether 208. In some examples, as shown, the connector 234 can comprise a carabiner which can easily be clipped to, and unclipped from, the tether 208. In other examples, the connector 234 can comprise any releasable latch or hook, such as a spring-loaded latch. In still other examples, the connector 234 can simply comprise a cable tie that can be cut off after every use.

The balloon 206 can also comprise one or more speakers 236. In some examples, video or other media may be projected directly on the balloon 206 or on a display 1102 beneath the balloon 206. See, FIG. 11, discussed below. To this end, the speakers 236 can provide complementary (or independent) audio via a wired (i.e., speaker wire can be much smaller than communications cables) or wireless connection (e.g., RF or Wi-Fi). Speakers 236, particularly large public address (or, PA) type speakers can be relatively heavy. To this end, in other examples, the speakers 236 can be located on the ground 204 to reduce the load on the balloon 206.

In some examples, the balloon 206 can also include a light 238. Because the height of the system 200 is essentially unlimited, in some configurations, the balloon 206 may require a beacon for aircraft. Thus, the light 238 may be the required strobe light for this purpose. In other examples, the light 238 can simply provide illumination for the balloon 206 or the ground 204 below.

In some examples, the balloon 206 can also include instrumentation 240. The instrumentation 240 can include a power source to power various instruments, the light 238, and/or the speakers 236. The instrumentation 240 can also include an altimeter, barometer, wind speed indicator, thermometer, and other meteorological instruments. This data may be useful when configuring the system 200 to ensure adequate guy wires 222 are provided, for example, or to alert workers to pending storms, which may necessitate lowering the balloon 206, among other things. Indeed, the balloon 206 can include a variety of sensors to provide a wide range of information.

In some examples, the balloon 206 can also include a plurality of separate chambers 242. Helium is difficult to produce and, therefore, expensive. Thus, in the case where only a percentage of the balloon's volume is required to be filled with helium to provide sufficient buoyancy, the remaining portions can be filled with air from a compressor or inflator. Thus, some chambers 242a can be filled with helium and other chambers 242b filled with air. In some examples, the system 200 can include a helium recovery system. As the name implies, the helium recovery system can recover the helium rather than simply releasing it into the atmosphere during break-down. This can help reduce the operating costs of the system 200 by recycling the helium, rather than replacing the helium with each use.

In some examples, the balloon 206 can also have media 244 printed on, attached to, or projected on one or more of the surfaces 218, 220. The media 244 can comprise any type of media such as, for example, advertising, TV shows or movies, live rebroadcasts (e.g., similar to a Jumbo Tron at a stadium). In some examples, the media 244 can be printed on, or attached to, the balloon 206 using materials that are transparent to, or otherwise do not effect, the signals 210. In other examples, in addition to the source antenna 202, a projector can project the media 244 onto the balloon 206 from the ground 204 (or close to the ground 204). In some examples, the bottom reflective surface 218 of the balloon 206 can include a thin-film transistor (TFT) display, light emitting diode (LED) display, or a liquid crystal display (LCD) that is substantially transparent to the signals 210 to display the media 244.

FIGS. 3A-5D depict various example designs for balloons 206 that reflect the signals 210 omni-directionally, or through approximately 360 degrees, back to the ground. This configuration may be useful when the system 200 can be centered in a large event. At a stadium, for example, the system 200 can be placed relatively close to the stadium, between the stadium and the main parking lot. In this position, the circular coverage area provided by the balloon 206 can substantially cover the stadium on one side and the parking lot on the other.

FIGS. 3A-3D depict a balloon 206 with a three-sided triangular top surface 220 and bottom reflective surface 218 corresponding to a typical tri-sector grid. Of course, the balloon 206 could also be four-sided (or pyramidal) to provide a four-sector grid. As mentioned above, the top surface 220 can simply be shaped to shed water, provide suitable aerodynamics, and/or to adjust the overall volume of the balloon 206. So, for a given perimeter, making the triangle (or pyramid) on the top surface 220 taller obviously increases its volume, and vice versa.

The height of the triangle on the bottom reflective surface 218, on the other hand, can change the radiation pattern provided by the balloon 206. A relatively tall triangle, for example, can reflect the signals 210 back to the ground over a relatively small area (a "tight pattern")—i.e., a larger antenna dimension can result in a narrower pattern, while a smaller antenna aperture can project a wider pattern. This may be useful at a convention, for example, with many attendees in a relatively confined area. A tight pattern may also reduce interference between the system 200 and neighboring communications systems, among other things.

Of course, decreasing the height of the triangle for the bottom reflective surface 218 can reflect the signals 210 back to the ground over a relatively large area (a "loose pattern"). This can be used to cover a larger area with a single system 200. This may help provide coverage for a musical festival, for example, with multiple stages at a large facility. It should be noted that, while the shape shown in FIGS. 3A-3D can create a 360-degree pattern on the ground 204, some slight signal degradation may occur due to the edges 302 of the bottom reflective surface 218. In other words, rather than reflecting cleanly back to the ground 204, a portion of the signals 210 incident on the edges 302 may be scattered, or otherwise lost.

To this end, as shown in FIGS. 4A-4D, in some examples, both the top surface 220 and bottom reflective surface 218 can be conical. In this manner, the facetless top surface 220 may stay cleaner without any edges to catch debris. In addition, the smooth surface removes the stress risers that are found at corners that can cause tears and fractures in the balloon 206. As before, the height of the cones on the top surface 220 can be shaped to shed water, provide suitable aerodynamics, and/or to adjust the overall volume of the balloon 206, among other things. Similarly, the height of the (inverted) cone for the bottom reflective surface 218 can be adjusted to provide a tight pattern (tall cone) or a loose pattern (short cone). In addition, the smooth profile of the bottom reflective surface 218 substantially eliminates the aforementioned problems associated with edges 302.

As shown in FIGS. 5A-5D, in some examples, the bottom reflective surface 218 can comprise a cone with curved sides (e.g., an (inverted) parabolic cone). In this manner, the pattern of the signals 210 can be further tailored to the application. As before, the height of the cone for the bottom reflective surface 218 can be adjusted to provide a tight pattern (tall cone) or a loose pattern (short cone). In this case, however, the curvature of the curve 502 can further tailor the signal pattern.

Figure 5A:
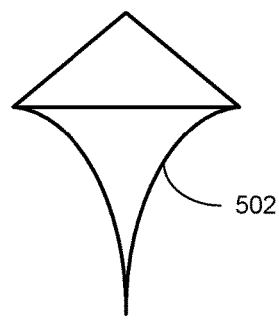
FIGS. 5A-5D depict a third example of the balloon to provide omni-coverage, in accordance with some examples of the present disclosure.
Figure 5B:
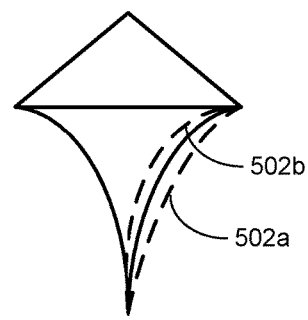
Figure 5C:
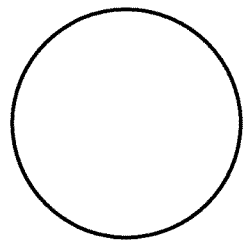
Figure 5D:
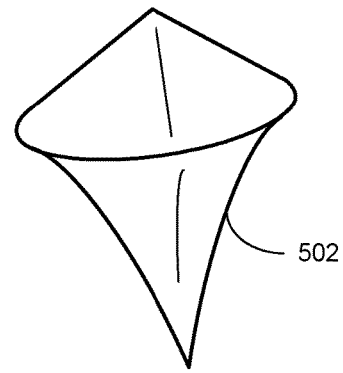
Figure 6A:
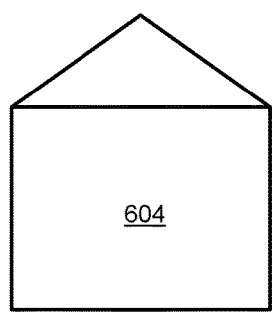
FIGS. 6A-6D depict a first example of the balloon to provide sector coverage, in accordance with some examples of the present disclosure.
Figure 6B:
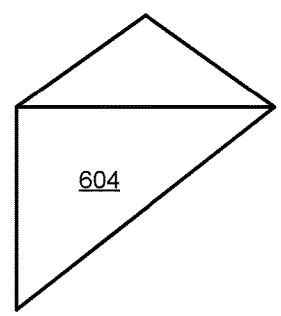
Figure 6C:
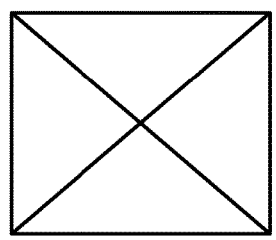
Figure 6D:
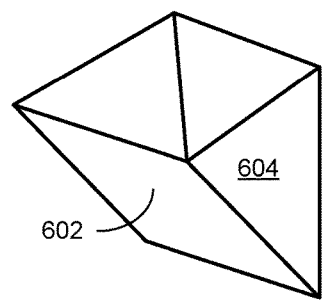

As shown in FIG. 5B, a relatively shallow curve 502a, for example, can create a looser pattern, while a steeper curve 502b can create a tighter pattern. In addition, the steeper curve 502b tends to reflect more waves back at the ground 204 close to the source antenna 202 when compared to the shallow curve 502a. Thus, a shallow curve 502a may be useful to cover a large area with a dispersed crowd, for example; while a steep curve 502b may be useful to cover a smaller area with a crown concentrated around the source antenna 202. In this manner, both the height of the cone and the curve of the curve 502 can be used to customize the signal pattern.

In some examples, rather than providing omni-coverage, it may be desirable to provide coverage over a more limited area, or in a specific pattern. This may be useful to concentrate cell site capacity, for example, to prevent interference with other nearby systems, or to limit access. To this end, as shown in FIGS. 6A-8D, in some examples, the system 200 can include balloons 206 that provide sector coverage. In other words, balloons 206 that, due to their shape, reflect the signals 210 only in certain general directions. Thus, they may cover, for example, approximately 45, 65, or 90 degrees around, rather than the substantially 360-degree coverage discussed above for omni-directional balloons 206. Of course, as discussed below, the actual shape and size of the sector coverage can be altered limitlessly with the shape of the bottom reflective surface 218.

This may be useful in the above-mentioned stadium example. In other words, once the football game has begun, a vast majority of users are in the stadium, not in the parking lot. Thus, it may be useful to redirect coverage from omni-coverage—that covers both the parking lot and the stadium—to sectoral coverage the covers only the stadium (or substantially so). Thus, during the pre-game festivities, for example, the system 200 may utilize a balloon 206 that provides omni-coverage because many users are in both the stadium and the parking lot (e.g., tailgaters). Once the game begins, however, the omni-coverage balloon 206 can simply be reeled in (lowered) and changed to a sectoral coverage balloon 206. Due to the modular nature of the system 200 this can be accomplished in minutes with little or no changes to the remaining components of the system 200 (e.g., the source antenna).

As shown in FIGS. 6A-6D, in some examples, the bottom reflective surface 218 can be a wedge. Thus, only signals 210 striking the face 602 of the wedge are reflected back to the ground 204. In other words, because the remaining sides 604 are substantially vertical, they do not reflect any (or very little) of the signals 210 back to the ground. Thus, the wedge creates a coverage pattern on the side of the balloon 206 opposite the face 602, but little or no signals 210 are radiated in the other three directions.

Again, the size of the coverage pattern is dictated by the relative angle of the wedge. A relatively steep wedge—and thus a face 602 turned more away from the ground 204—creates a relatively large pattern further from the system. A face 602 at an angle more towards the ground 204—creates a relatively small pattern that is contained closer to the system. That is, the tilt angle of the reflective surface (i.e., relative to the ground 204) can be adjusted using the guy wires to extend or reduce coverage.

As shown in FIGS. 7A-7D, in some examples, the face 702 can be curved inward (e.g., parabolic, arcuate, etc.), while the sides 704 are vertical. Thus, only signals 210 striking the face 702 of the balloon 206 are reflected back to the ground 204. In other words, because the remaining sides 704 are substantially vertical, they do not reflect any (or very little) of the signals 210 back to the ground. Thus, the curve 706 creates a coverage pattern on the side of the balloon 206 opposite the face 702, but little or no signals 210 are radiated in the other three directions.

As before, this can enable both the height and the curvature of the curve 706 to be used to tailor the size and concentration of signals 210 in the pattern. The height of the curve 706 can be adjusted to provide a tight pattern (e.g., a tall parabola) or a loose pattern (e.g., a short parabola). In this case, however, the curvature of the curve 706 can further tailor the signal pattern.

Figure 7A:
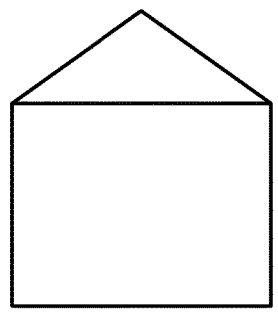
FIGS. 7A-7D depict a second example of the balloon to provide sector coverage, in accordance with some examples of the present disclosure.
Figure 7B:
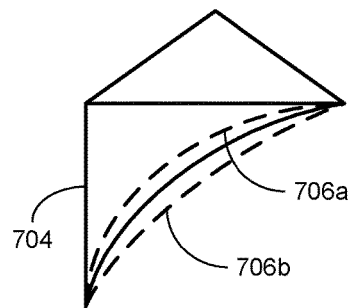
Figure 7C:
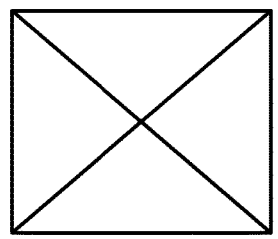
Figure 7D:
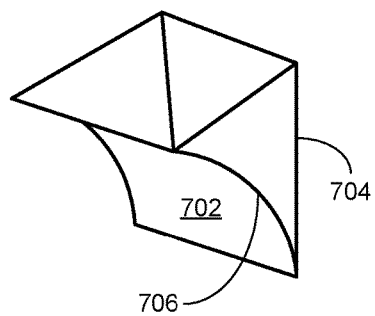
Figure 8A:
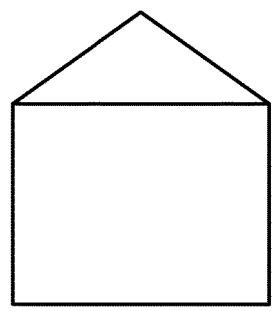
FIGS. 8A-8D depict a third example of the balloon to provide sector coverage, in accordance with some examples of the present disclosure.
Figure 8B:
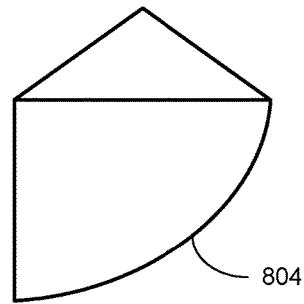
Figure 8C:
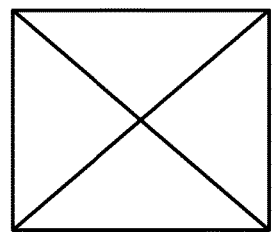
Figure 8D:
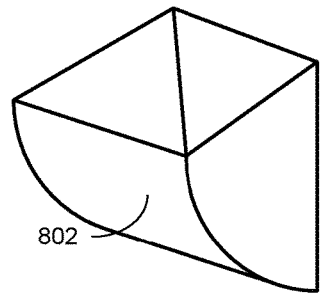

As shown in FIG. 7B, a relatively shallow curve 706a, for example, can create a looser pattern, while a steeper curve 706b can create a tighter pattern. In addition, the steeper curve 706b tends to reflect less of the waves back at the ground 204 further from the source antenna 202 when compared to the shallow curve 706a. Thus, as mentioned above with respect to FIG. 5B, a shallow curve 706a may be useful to cover a smaller area with a concentrated crowd, for example; while a steep curve 706b may be useful to cover a larger area with a crowd dispersed around the source antenna 202. In this manner, both the height of the parabolic cone and the curve of the curve 706 can be used to customize the signal pattern.

As shown in FIGS. 8A-8D, in some examples, the face 802 can comprise an outward curve 804. In this configuration, signals 210 can be directed downward, towards the ground 204, sideways, and even upward. This may be useful to provide coverage at a stadium, for example, where some of the users are above the system 200 (e.g., in the "nose bleed" seats, some are relatively even with the system, and some are below the system 200 (e.g., field level seats). As before, both the height and curvature of the curve 804 can be adjusted to facilitate different coverage patterns.

As mentioned above, because no mast is required, the system 200 can be relatively light, small, and simple. Depending on the additional bandwidth required, therefore, the system 200 could be small enough to be hand carried, pulled on a cart, or packed in a suitcase for transport. In other examples, relatively large systems 200 can be carried in, or mounted on, standard vehicles, like a standard cargo van (FIG. 9A), a trailer (FIG. 9B), or pickup truck.

Figure 9A:
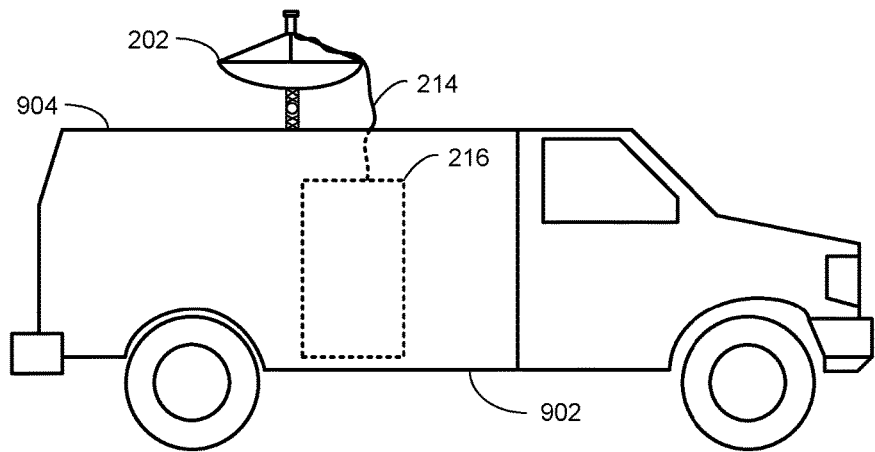
FIGS. 9A and 9B depict the system mounted on a van and a trailer, respectively, in accordance with some examples of the present disclosure.

As shown in FIG. 9A, in some examples, the system 900 can be mounted in and/or on a vehicle 902. Because the system 900 is so small and light, the vehicle 902 can be a normal passenger or cargo van (as opposed to the heavy-duty truck shown in FIG. 1, for example). This reduces the cost of the system 900 significantly based solely on the cost of the vehicle 902 when compared to the heavy-duty truck 102. A light duty van (e.g., a Ford Transit) costs less than $30,000 new, for example, while a medium- or heavy-duty truck can cost well in excess of $100,000.

As shown, in some examples, the source antenna 202 can be mounted to the roof 904 of the vehicle 902. This may ease setup and reduce setup times, for example, because once the vehicle 902 is parked, the source antenna 202 is "set up." In addition, in some examples, the BTS 216 can be mounted inside the vehicle 902. In this configuration, the cables 214 can remain connected between the BTS 216 and the source antenna 202, further reducing setup times. The BTS 216 can be connected to vehicle power (e.g., a 12 or 120 volt system in the vehicle 902) obviating the need for a generator or other outside power source, further reducing the cost of the system 900. Of course, if the BTS 216 exceeds the output of the vehicle 902, the vehicle 902 can include an onboard power generator or other outside power source. As before, the onboard power generator can include a gasoline or diesel powered generator, solar panels, or a wind turbine, among other things.

Figure 9B:
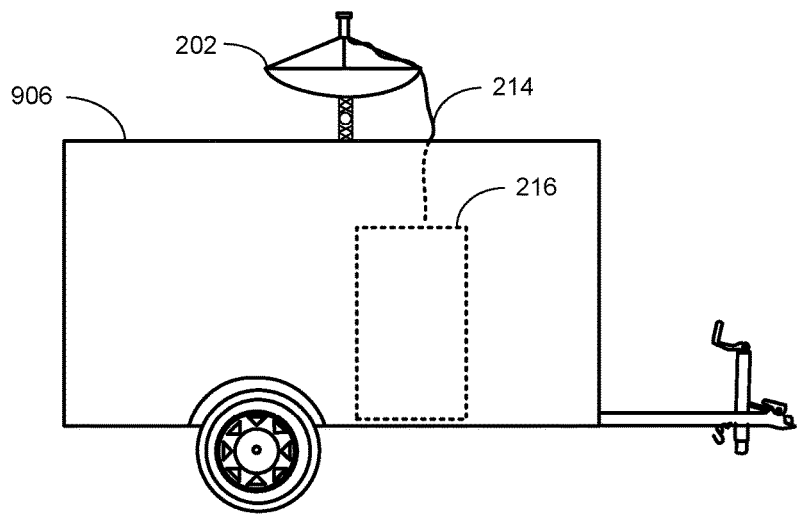

As shown in FIG. 9B, the system 900 can also be mounted on, or in, a trailer 906 in substantially the same manner. This can provide the same reductions in setup time discussed above, for example, yet provide even lower costs. Enclosed trailers can be purchased new for as little as $1000. This represents a significant savings over the temporary cell site 100 shown in FIG. 1, for example. Indeed, due to the light weight of the system 900, the trailer 906 can simply be pulled with existing vehicle's (e.g., maintenance trucks or personal vehicles), almost eliminating capital expenditures.

As shown in FIG. 9C, in some examples, the vehicle 902 (or trailer 906) can essentially act as a self-contained mobile cell tower. In this configuration, the system 900 can be totally carried by and/or set up on the vehicle 902. As shown, in some examples, the vehicle 902 can include one or more tie-downs 908 to enable the guy wires 222 to be anchored directly on the vehicle 902. In other examples, if broader stabilization is needed, for example, the guy wires 222 can be anchored to the ground 204 proximate the vehicle 902.

In some examples, the vehicle 902 can also include the winch 224. Thus, a worker can merely drive the vehicle 902 to a predetermined location near an event, attach the balloon 206 to the tether 208, and pay the tether 208 out with the winch 224 to a predetermine height (e.g., 125, 175, or 225 feet) and then anchor the guy wires 222 on the vehicle 902 or the ground 204. In this configuration, the worker does not need to unload anything but the balloon 206 and the system 900 is almost completely self-contained. This reduces the time, effort, and skill required to setup the system 900.

Figure 10:
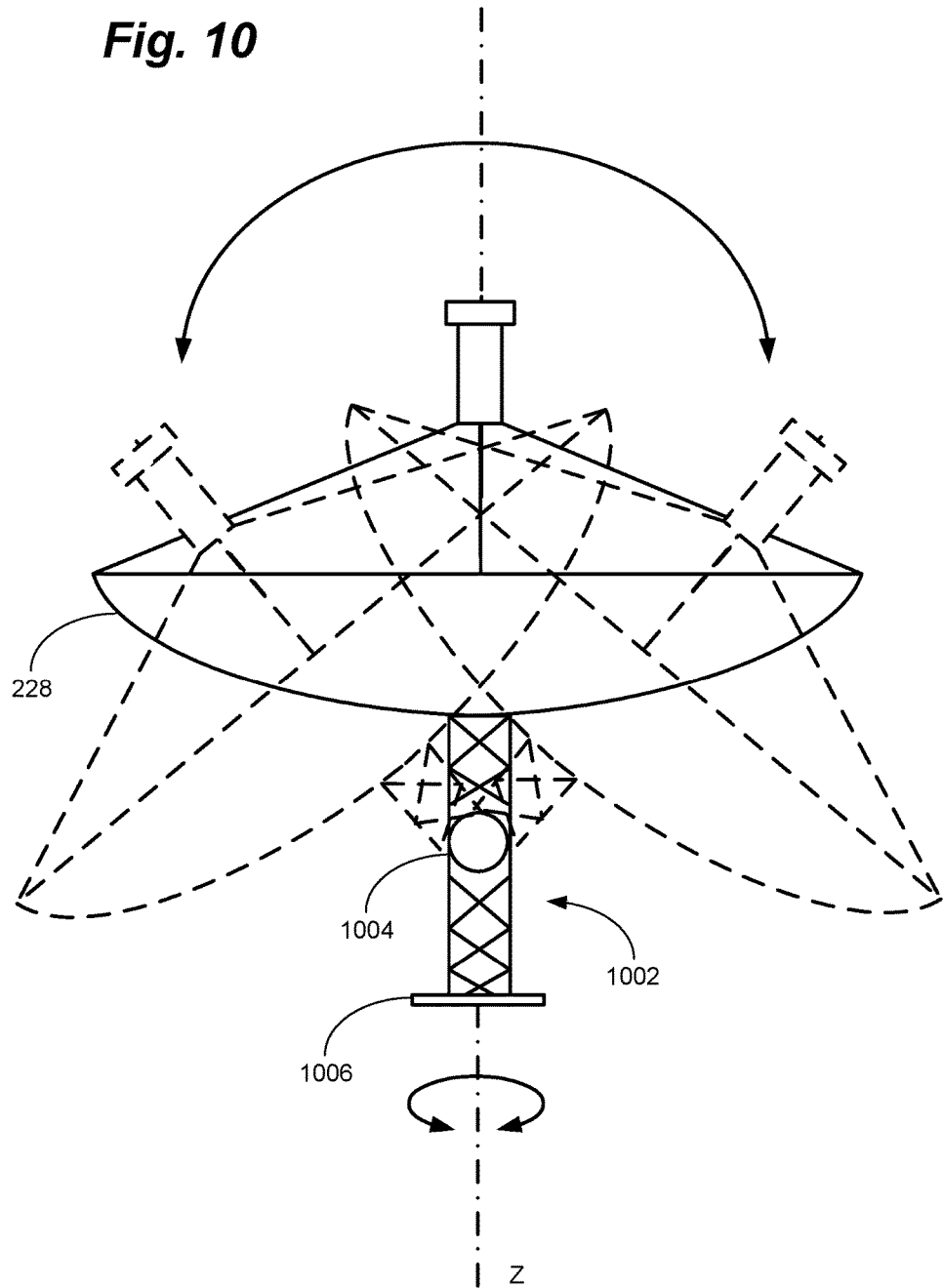
FIG. 10 depicts an adjustable source antenna, in accordance with some examples of the present disclosure.

As shown in FIG. 10, in some examples, to provide additional flexibility, the source antenna 202 can be repositionable. As shown, the source antenna 202 may be able to pivot about the y-axis (i.e., the axis coming out of the page) and/or rotate about the z-axis. To this end, the mount 1002 for the source antenna 202 can include a horizontal pivot 1004 and a vertical pivot 1006, or similar.

As shown, the horizontal pivot 1004 can comprise a hinge, ball joint, or other type of pivot that enables the source antenna 202 to be repositioned from the vertical position (i.e., the position in which the source antenna is aimed vertically and the dish is horizontal). The horizontal pivot 1004 can enable the source antenna to be repositioned to many angles between approximately 30 degrees and 150 degrees. Of course, due to the positioning of the balloon 206 overhead, this range of motion may not be necessary. In addition, at some point the dish of the source antenna 202 may hit the mount 1002, preventing additional tilt.

In some examples, the source antenna 202 can also include a vertical pivot 1006 to enable it to rotate around the z-axis. In this manner, when in a non-vertical position, the source antenna 202 can be aimed radially to align with the balloon 206. In some examples, the pivots 1004, 1006 can include electric (e.g., servo), hydraulic, or pneumatic actuators or motors to affect movement. In other examples, the pivots 1004, 1006 may be simple bolts and wingnuts, for example, to enable manual repositioning. In some examples, an alignment laser, signal meter, or other aids can be employed to aid in pointing the source antenna 202 at the optimum location of the bottom reflective surface 218 of the balloon 206.

Being able to reposition the source antenna 202 may be useful in transit to reduce the aerodynamic forces on the source antenna 202, for example, or to provide some flexibility in the positioning of the balloon 206. If the source antenna 202 is mounted to a vehicle 902 or trailer 906, the source antenna 202 may be positioned with the open side of the dish 228 facing backward (i.e., the source antenna aimed substantially horizontally) during transit, for example. In this configuration, the source antenna 202 presents a more aerodynamic shape, which reduces the stress on the mount 1002, for example, and may improve the fuel mileage of the vehicle 902. If the balloon 206 needs to be positioned such that it is not directly above the source antenna 202, on the other hand, the source antenna 202 can be pivoted and rotated, as necessary, to properly aim the source antenna 202 at the balloon 206. This may be useful in cases where the balloon 206 needs to be offset from the vertical position due to overhead obstructions such as power lines, stadium seating, or other obstructions.

Figure 11:
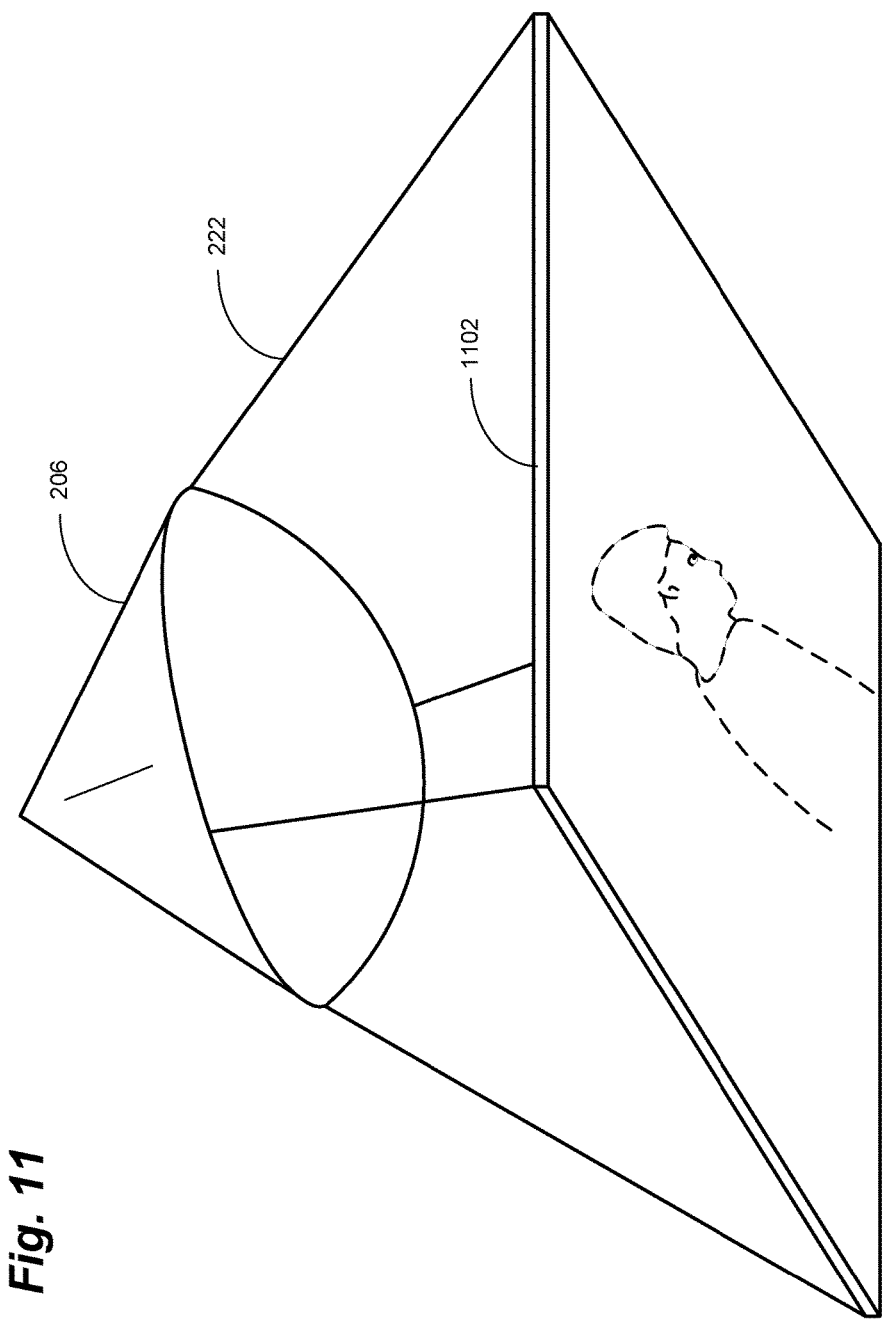
FIG. 11 depicts a balloon with a display screen attached, in accordance with some examples of the present disclosure.

In some examples, as shown in FIG. 11, the balloon 206 can be configured to carry a screen, billboard, or display (collectively, "display" 1102.) The display 1102 can be suspended from the balloon 206 using the existing guy wires 222, as shown, or can have a separate support or frame. In this configuration, the display 1102 can comprise, for example, a projector screen to enable images or video to be projected onto the display 1102 from the ground. In this manner, the system 200 can act essentially as a "jumbo Tron." This may be useful at concerts and music festivals, for example, where fans are often very far from the stage. In this configuration, the display 1102 can be substantially transparent to the signals 210, to minimize any effect on communications, yet reflective of light (similar to a projection screen).

In other examples, the display 1102 can comprise an electronic display—e.g., a TFT display, LED display, or a LCD—to provide programmable media, information, and/or advertising. In still other examples, the display 1102 can comprise a simple billboard, banner, or other fixed media. In this configuration, the display 1102 can be used, for example, for advertising (like a conventional billboard), to provide safety information (e.g., to mark exits or first aid stations), or simply to provide information (e.g., locations for bathrooms and concessions). Regardless of configuration, the planform and/or volume of the balloon 206 can be designed to provide sufficient buoyancy to lift the display 1102 into the air along with the balloon 206. Thus, like the rest of the system 200, no additional support is required to implement the display 1102.

Figure 12:
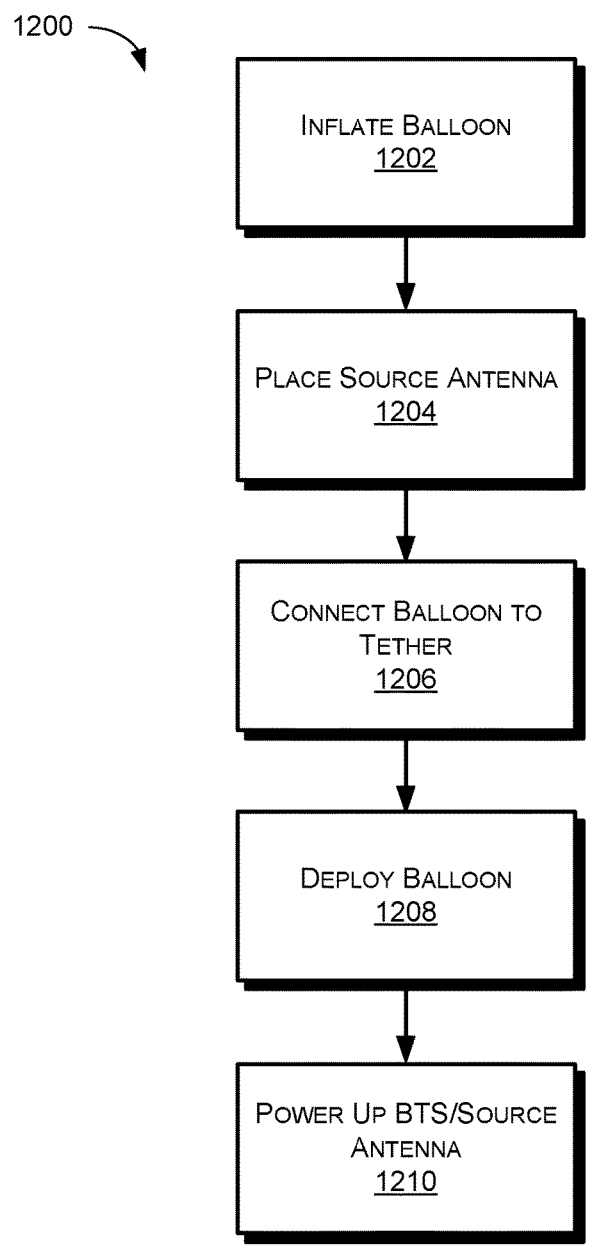
FIG. 12 is a flowchart of an example method for setting up the system, in accordance with some examples of the present disclosure.

As shown in FIG. 12, examples of the present disclosure can also comprise a method 1200 for deploying the system 200 on location. As discussed above, the system 200 is lightweight, portable, and easily deployed. The system 200 can be carried, unmounted, in the back of a pickup truck, for example, or may be partially or completely mounted on a vehicle 902 or trailer 906. Once in location, the system 200 can be setup in minutes.

In some examples, to save space during transportation, the balloon 206 can be stored deflated. A Mylar® balloon, for example, can be flattened and folded into a very small volume. To this end, at 1202, the worker can inflate the balloon 206. This can be done using a standard helium inflation kit, for example. In some examples, the level of inflation can be varied based on the exact configuration (e.g., whether a display 1102 is being used), temperature, and/or other weather and location conditions. Of course, in some examples, the balloon 206 can be transported inflated, making this step optional.

At 1204, the worker can place the source antenna 202 in a suitable location. This can include unloading the source antenna 202 from the vehicle, finding a suitably flat, firm location, and/or securing the source antenna 202 to the ground 204. Of course, as discussed above, in some examples, the source antenna 202 can be mounted to a vehicle 902 or trailer 906. In this case, placing the source antenna can include aiming the source antenna 202, if necessary. This may include returning the source antenna 202 to the vertical position from the horizontal position used during transit, for example, or aiming the source antenna 202 for a non-vertical balloon 206 configuration. This may also include using a signal meter, laser, or other tool to aim the source antenna 202 at the balloon 206 to maximize signal strength.

At 1206, the balloon 206 can be connected to the tether 208. As shown in FIG. 2B, the tether 208 can be threaded up through the source antenna 202, for example, or anchored around the source antenna 202 to the ground 204 using additional strapping, for example. As discussed above, the balloon 206 and tether 208 can connect using a simple carabiner or snap ring, for example, or other suitable method. Since there is relatively low force on the tether 208 in most conditions, the attachment method can focus generally on ease of use over ultimate strength.

At 1208, the worker can deploy the balloon 206. In some cases, this can be as simple as letting the balloon 206 go. The tether 208 can be a predetermined length, for example, so that simply releasing the balloon 206 enables it to rise to the predetermined height and then stop. In other examples, the balloon 206 can be deployed using a hand operated or electric winch 224. In some examples, the tether 208 can have length markings, for example, to enable the worker to determine when the balloon 206 is at the predetermined height. In other examples, the winch 224 can include a servo motor, for example, which can provide encoder positioning information to determine how much tether 208 has been payed out.

At 1210, the worker can power up the BTS 216 and source antenna 202 and the system 200 is operational. This can include starting the vehicle 902 or a generator, for example, or connecting the BTS 216 to mains power, among other things. This can also include making any necessary uplink connections from the system 200 to the backbone. This can include one or more connections such as, for example, connecting to a local internet or telecommunications network switch (e.g., via Ethernet cable) or establishing a microwave link.

The system 200 and methods 1200 described above provide a simple, robust, and easy to install communications link to provide additional communications and data bandwidth in high-demand, but possibly temporary, locations. Thus, the system 200 can be used to provide additional bandwidth during sporting events, concerts and music festivals, and conventions, among other things. The system is simple and lightweight, reducing capital costs and setup time. The system 200 can provide additional features such as, for example, instrumentation, lighting, and/or a display 1102.

While several possible examples are disclosed above, examples of the present disclosure are not so limited. For instance, while the system 200 has been disclosed for use with cellular data and communications, the system 200 can be used with other types of wireless data and communications system. Thus, the system 200 and method 1200 described herein can be used with Wi-Fi systems, microwave, citizen band (CB), family radio service (FRS), general mobile radio service (GMRS), future 5G communication systems, or other systems. The antenna system 200 can be applied to operate over a wide range of frequency bands.

In addition, the location and configuration used for various features of examples of the present disclosure such as, for example, the order of the steps used, the components of the system 200, the location and type of source antenna 202, the type and materials for the balloon 206, and other features can be varied according to a particular system size, for example, or a particular location that requires a slight variation due to, for example, local topography, overhead obstructions, or interference sources, among other things. Such changes are intended to be embraced within the scope of this disclosure.

The specific configurations, machines, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
   a lighter-than-air reflector comprising at least a bottom reflective surface, the bottom reflective surface reflective of at least one type of electromagnetic wave;
   a tether, with a first end and a second end, the first end detachably coupleable to the lighter-than-air reflector and the second end detachably coupleable to an anchor point proximate a ground level;
   a portable source antenna aimable at the bottom reflective surface to emit a first group of one or more electromagnetic waves at the bottom reflective surface and to receive a second group of one or more electromagnetic waves from the bottom reflective surface; and
   a portable base transceiver station (BTS) in communication with and physically coupled to the portable source antenna to provide connectivity between one or more user equipment (UE) at a ground level and one or more data networks or communications networks;
   wherein the bottom reflective surface reflects the first group of one or more electromagnetic waves from the portable source antenna to user equipment (UE); and
   wherein the bottom reflective surface reflects the second group of one or more electromagnetic waves from the UE at the ground level to the portable source antenna.

2. The system of claim 1, wherein the lighter-than-air reflector comprises a balloon; and
   wherein the bottom reflective surface comprises a metallized polymer.

3. The system of claim 1, wherein the lighter-than-air reflector comprises a balloon; and
   wherein the bottom reflective surface is sized and shaped to reflect the at least one type of electromagnetic wave omni-directionally.

4. The system of claim 3, wherein the bottom reflective surface comprises an inverted cone.

5. The system of claim 1, wherein the lighter-than-air reflector comprises a balloon; and
   wherein the bottom reflective surface is sized and shaped to reflect the at least one type of electromagnetic wave to provide sector coverage.

6. The system of claim 5, wherein the bottom reflective surface comprises a wedge.

7. The system of claim 1, wherein the tether comprises a plurality of guy wires, each with a first end and a second end, the first ends detachably coupled to the lighter-than-air reflector and the second ends detachably coupled to the ground, the plurality of guy wires to maintain the position of the lighter-than-air reflector with respect to the portable source antenna.

8. A system comprising:
   a lighter-than-air balloon comprising a bottom reflective surface, the bottom reflective surface reflective of at least one type of electromagnetic wave;
   a portable source antenna that is detachably coupled to a vehicle and aimable at the bottom reflective surface to emit a first group of one or more electromagnetic waves at the bottom reflective surface and to receive a second group of one or more electromagnetic waves from the bottom reflective surface;
   a tether, with a first end and a second end, the first end detachably coupleable to the balloon and the second end detachably coupleable to an anchor point on the vehicle;
   a plurality of guy wires, each with a first end and a second end, the first ends detachably coupled to the balloon and the second ends detachably coupled to the vehicle, the guy wires to maintain the position of the balloon with respect to the portable source antenna; and
   a portable base transceiver station (BTS) that is detachably coupleable to the vehicle, the BTS in communication with and coupled to the portable source antenna to provide connectivity between one or more user equipment (UE) at a ground level and one or more data networks or communications networks;
   wherein the bottom reflective surface reflects the first group of one or more electromagnetic waves from the portable source antenna to user equipment (UE); and
   wherein the bottom reflective surface reflects the second group of one or more electromagnetic waves from the UE at the ground level to the portable source antenna.

9. The system of claim 8, wherein the anchor point on the vehicle comprises a winch to raise and lower the balloon.

10. The system of claim 8, wherein a top surface of the balloon comprises a cone or a pyramid to shed water and debris off the top surface.

11. The system of claim 8, wherein the bottom reflective surface comprises an inverted parabolic cone.

12. The system of claim 8, further comprising a display, to display one or more of video or still images, the display suspended from the balloon proximate the first end of the tether.

13. The system of claim 12, wherein the display comprises a projector screen to enable the video or still images to be projected onto the display from the ground level.

14. A method comprising:
placing a portable source antenna in a predetermined location;
attaching a first end of a tether to a lighter-than-air balloon, the balloon comprising a bottom reflective surface;
paying out the tether to position the balloon at a predetermined height above the portable source antenna;
connecting the portable source antenna to a base transceiver station (BTS);
connecting the BTS to at least one of a cellular network, a data network, or a power source; and
providing power access to at least the BTS to provide additional communications bandwidth in a predetermined pattern and range proximate the source antenna;
wherein the bottom reflective surface reflects a first group of one or more electromagnetic waves from the portable source antenna to user equipment (UE) proximate a ground level; and
wherein the bottom reflective surface reflects a second group of one or more electromagnetic waves from the UE to the portable source antenna.

15. The method of claim 14, further comprising:
inflating the balloon with a lighter-than-air gas.

16. The method of claim 14, further comprising:
attaching a first end of each of a plurality of guy wires to the balloon; and
anchoring the plurality of guy wires to adjust and maintain the balloon at a predetermined position above the portable source antenna.

17. The method of claim 16, wherein adjusting the balloon to the predetermined position above the portable source antenna comprises placing the balloon vertically above the portable source antenna.

18. The method of claim 14, further comprising:
disconnecting the portable BTS from the at least one of a cellular network, a data network, or a power source; and
disconnecting the portable source antenna and the portable BTS;
reeling in the tether to return the balloon to the ground level;
detaching the first end of the tether from the balloon; and
placing at least the portable source antenna, the tether, and the balloon inside a vehicle.

19. The method of claim 18, further comprising:
deflating the balloon to reduce the volume of the balloon for transportation.

20. The method of claim 18, wherein paying out the tether comprises operating a winch in a first direction; and
wherein reeling in the tether comprises operating the winch in a second direction.

* * * * *